United States Patent

[11] 3,538,955

| [72] | Inventor | James H. Anderson<br>1615 Hillock Lane, York, Pennsylvania 17403 |
|---|---|---|
| [21] | Appl. No. | 675,680 |
| [22] | Filed | Oct. 16, 1967 |
| [45] | Patented | Nov. 10, 1970 |

[54] SUSPENDED SUBMARINE PIPE CONSTRUCTION
8 Claims, 9 Drawing Figs.

[52] U.S. Cl................................................ 138/103,
138/117; 137/236
[51] Int. Cl..................................................... F16l 55/00
[50] Field of Search............................................ 138/38,
103, 111, 112, 114, 115, 116, 117, 137, 139, 148,
149; 137/236(Inquired); 141/(Inquired;
9/8(Inquired); 222/(Inquired)

[56] References Cited
UNITED STATES PATENTS

| 3,117,596 | 1/1964 | Kahn | 138/111 |
|---|---|---|---|
| 3,425,453 | 2/1969 | Fuller | 138/111 |
| 3,426,803 | 2/1969 | Kikukawa | 138/114 |

Primary Examiner—Houston S. Bell, Jr.
Attorney—Cushman, Darby and Cushman

ABSTRACT: A submerged, large diameter, buoyant pipe suspended from its upper end and having a lower end open to the sea for drawing in sea water. The wall of the pipe is constructed of a plurality of sealed hollow tubes arranged parallel to each other in a circular pattern and externally sealed one to another along their lengths. Exterior stiffening rings are provided at intervals along the pipe.

Patented Nov. 10, 1970

3,538,955

INVENTOR
JAMES H. ANDERSON

BY
Cushman, Darby & Cushman
ATTORNEYS

INVENTOR
JAMES H. ANDERSON

INVENTOR
JAMES H. ANDERSON

BY
*Cushman, Darby & Cushman*
ATTORNEYS

SUSPENDED SUBMARINE PIPE CONSTRUCTION

This invention relates to pipe constructions and in particular to large diameter submerged pipes having buoyant or semibuoyant walls. Such pipes are useful in certain submerged oil and gas well constructions and in systems which require a large supply of cold water from deep in the sea, such as the sea water power plant described in application, Ser. No. 600,287, filed Sept. 27, 1966, now U.S. Pat. No. 3,312,054.

A long pipe which is vertically suspended from its upper end is subjected to high tensile stresses due to the weight of the pipe. When the pipe is suspended in a body of water it is possible to reduce the tensile stresses by buoyantly supporting the pipe along its length. In the past it generally has been the practice to secure distinct buoyant members, such as hollow floats, to the pipe at intervals in order to increase the buoyancy of the pipe.

It is the object of the present invention to provide a pipe construction having substantial buoyancy in which the pipe wall is formed of a plurality of sealed tubes arranged parallel to each other with their axes parallel to the axis of the pipe and sealed to one another along their lengths. The individual sealed hollow tubes, which are of small diameter relative to the diameter of the main pipe, may be buoyant in water or they may be nonbuoyant depending on their wall thickness and inside diameter and what they contain. In either case, however, a buoyant force will act on each tube when submerged with the result that there will be an upward force exerted along the length of the vertically submerged pipe. When the submerged pipe is supported from its upper end, the buoyant force reduces the tensile stresses in the pipe wall. If the pipe is supported at its lower end on the submerged bottom, the buoyant force reduces the compressive stresses in the pipe wall. In addition, the tubular construction of the pipe wall is more flexible than a solid pipe wall of the same diameter, and this is advantageous when the pipe is employed in very deep water.

The buoyancy of the tubes may be varied by varying the density of the material in the tubes, as by filling the tubes with gases lighter or heavier than air. At deep levels, where external pressure on the tubes is high, it may be desirable to pressurize the gas to reduce the pressure differential across the walls of the tubes.

It is a more specific object to provide a pipe construction in which the main pipe wall is constructed of a plurality of hollow cylindrical sections, the wall of each section being made of tubes as described above and being connected end-to-end with the wall of similar sections. In the preferred form the connection between sections includes a plug structure which closes the ends of the tubes of the two adjacent sections and an external stiffening ring encircling the pipe and secured to the plug structure.

The invention will be further understood from the following detailed description of an illustrative embodiment taken with the drawings in which:

FIG. 3 is a fragmentary sectional view taken on the line 3—3 of FIG. 2;

FIG. 4 is a fragmentary sectional view taken on the line 4—4 of FIG. 3;

Figure 6:
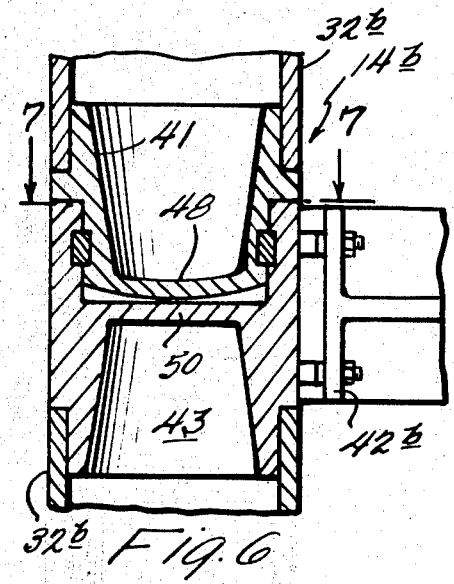
Figure 7:
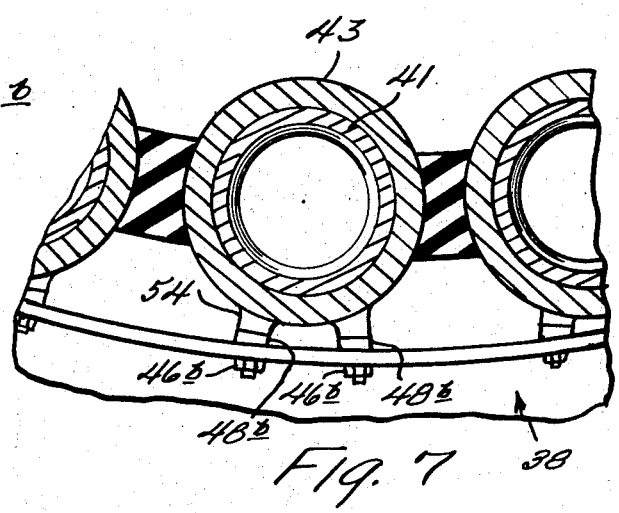
Figure 8:
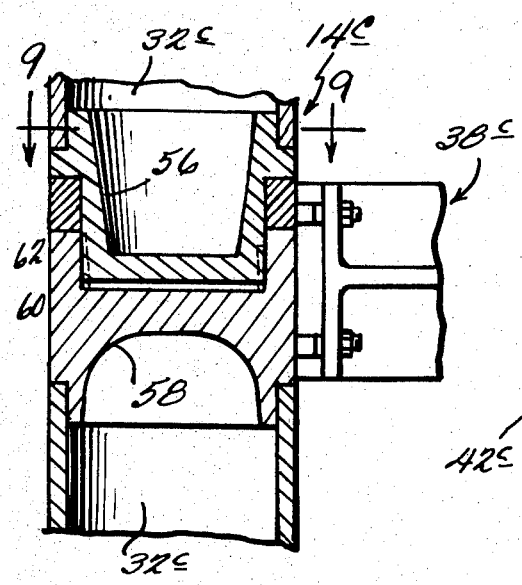
Figure 9:
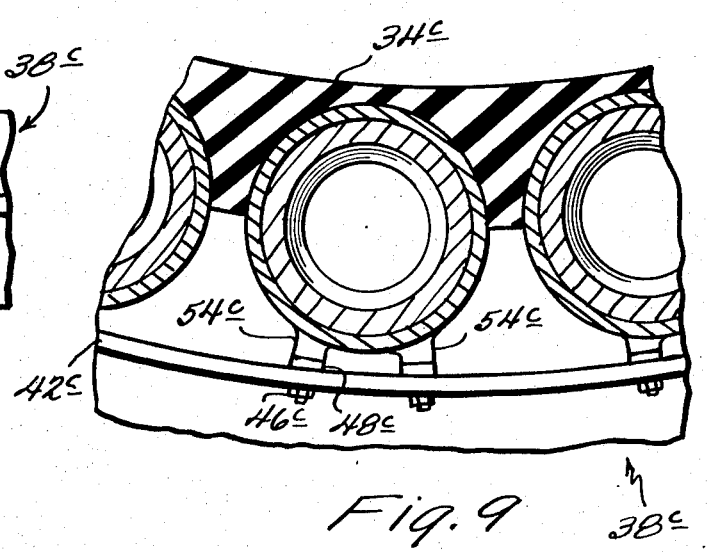

FIG. 6 and 8 are sectional views similar to FIG. 3 illustrating two additional joint constructions; and FIGS. 7 and 9 are sectional views taken on the lines 7—7 and 9—9 of FIGS. 6 and 8, respectively.

Figure 1:
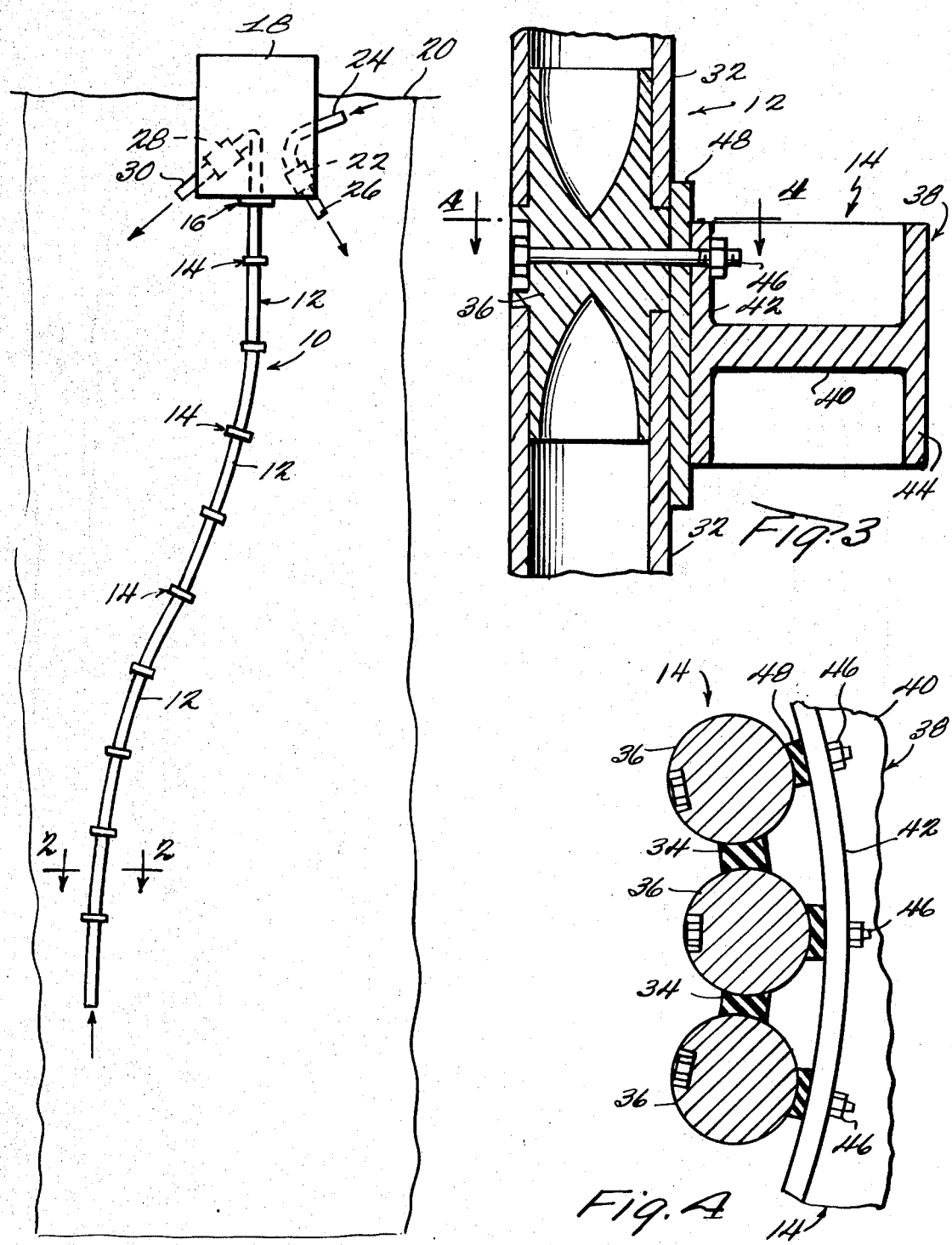
FIG. 1 is a schematic elevational view of a submerged, generally vertical pipe suspended from its upper end.

In FIG. 1 there is illustrated schematically a long, suspended generally vertical pipe 10 which embodies the principles of the present invention. The pipe 10 is constructed on distinct longitudinal sections 12 connected together end-to-end by joints 14, the size of the latter being enlarged relative to the size of pipe 10 for ease of illustration. The upper end of the pipe 10 is connected at 16 to a buoyant hull 18 floating at the surface 20 of the sea, and the lower end is open to the sea at a deep level. The connection at 16 may be rigid or flexible and may include a gimbal connection. Due to naturally occuring sea currents at different levels the pipe 10 will not hang completely straight but will bend under the force of the water. The bends are exaggerated in the drawing for ease of illustration.

The overall arrangement of FIG. 1 is suitable for utilizing the temperature difference between cold sea water from deep in the sea and relatively warm, surface sea water for the purpose of producing power. As fully disclosed in the aforesaid application, Ser. No. 600,287, power may be generated by vaporizing a working fluid with the heat of the warm surface water, expanding the working fluid vapor to obtain power, and condensing the expanded vapor by heat exchange with cold sea water. FIG. 1 schematically illustrates a power plant of this type. A working fluid vaporizer in the form of a heat exchanger 22 receives warm surface water through a pipe 24 and discharges the water through a pipe 26. Cold water from the suspended pipe 10 is passed to a working fluid condenser in the form of a heat exchanger 28 and then to a discharge pipe 30. For ease of illustration the working fluid circuit is not shown.

Figure 2:
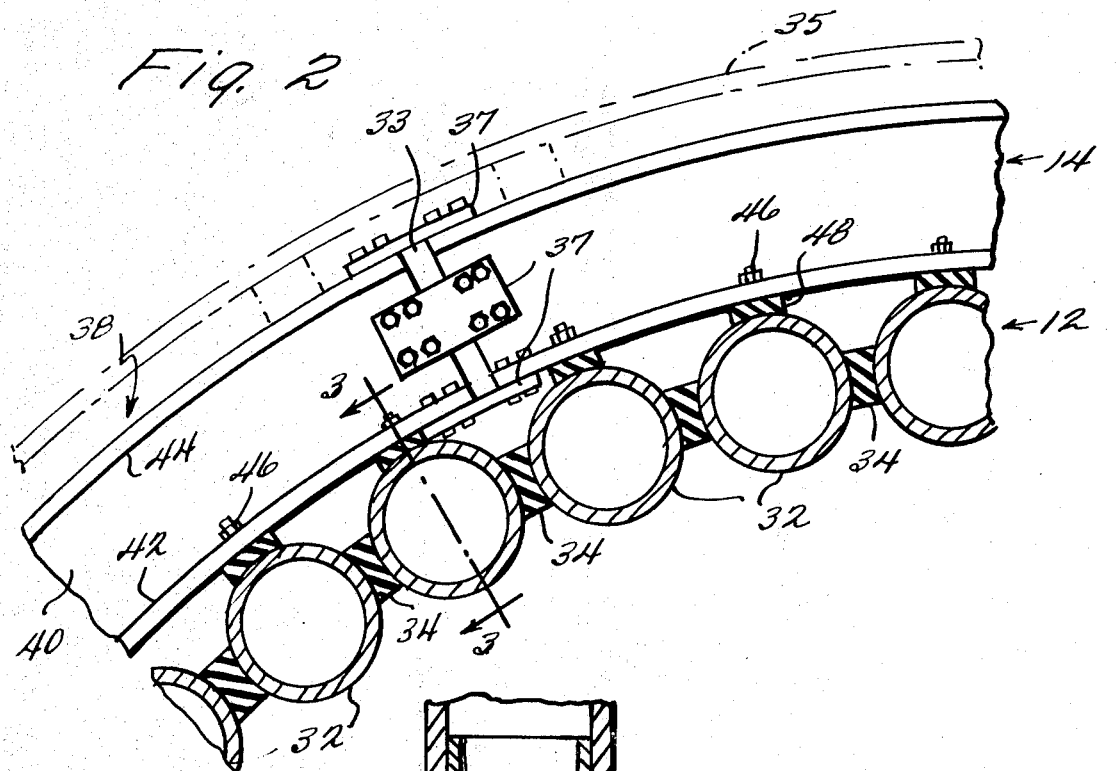
FIG. 2 is a fragmentary transverse sectional view, on an enlarged scale, of the pipe of FIG. 1 taken generally on the line 2—2.

The suspended pipe 10 may be hundreds or even several thousand feet long and will be subjected to high tensile stresses due to its own weight unless these stresses are reduced by supporting the pipe along its length in some manner. According to the principles of the present invention the pipe 10 is buoyantly supported along its length and at the same time is rendered relatively flexible by the special construction of the pipe wall. As seen in FIG. 2, the wall of each pipe section 12 is formed of parallel straight tubes 32 arranged with their axes disposed in a circular pattern. In the illustrated embodiment the tubes 32 are spaced slightly from each other, and the spaces are sealed along the length of the tubes 32 with elongated resilient, gasketlike elements 34 formed of plastic material such as rubber.

As best seen in FIGS. 3 and 4, the tubes 32 are held in a circular pattern by the joints 14 which also serve to connect the pipe sections 12 end-to-end. At the location of each joint 14 the end of each tube 32 is closed by a double ended plug 36 which fits into the bores of two aligned tubes 32 and seals them against leakage. An external stiffening ring 38 having a horizontal web 40 and two vertical flanges 42 and 44 encircles the tubes 32. All the plugs 36 are connected to the inner flange 42 by means of bolts 46 which pass transversely through the center portion of each plug 32. In order to permit some relative movement between the stiffening ring 38 and the pipe 10 when the latter bends under the action of water currents, a resilient pad 48 of rubber or similar material is sandwiched between the flange 42 and each plug 36. It is not necessary that each plug 36 be secured to the stiffening ring 38, and in some constructions it may suffice to secure, for example, only every fourth plug.

While the keying elements 34 can be cemented or molded to the walls of the tubes 32, this arrangement may be subject to leakage after prolonged use. It is preferred to maintain the elements 34 under compression thereby locking them in place mechanically. This can be accomplished by arranging the tubes 32 and keying elements 34 in their proper relative positions, compressing the circular assembly in a radially inward direction and then securing the stiffening ring 38 to the tubes 32 and described above. To this end the ring 38 may be made in separate arcuate sections spaced from each other by gaps 33. Initially the arcuate sections will not be connected to each other and will be held in place by loosely securing the bolts 46. Then the assembly is radially compressed, as by tightening a cable 35 around the circumference of the ring 38. The bolts 46 are then tightened, and the arcuate ring sections are rigidly connected to each other in some suitable manner, as by means of plates 37 which may be bolted, welded or riveted across the gaps 33. When the cable 35 is removed. The keying elements remain compressed between tubes 32 and mechanically locked in place.

Figure 5:
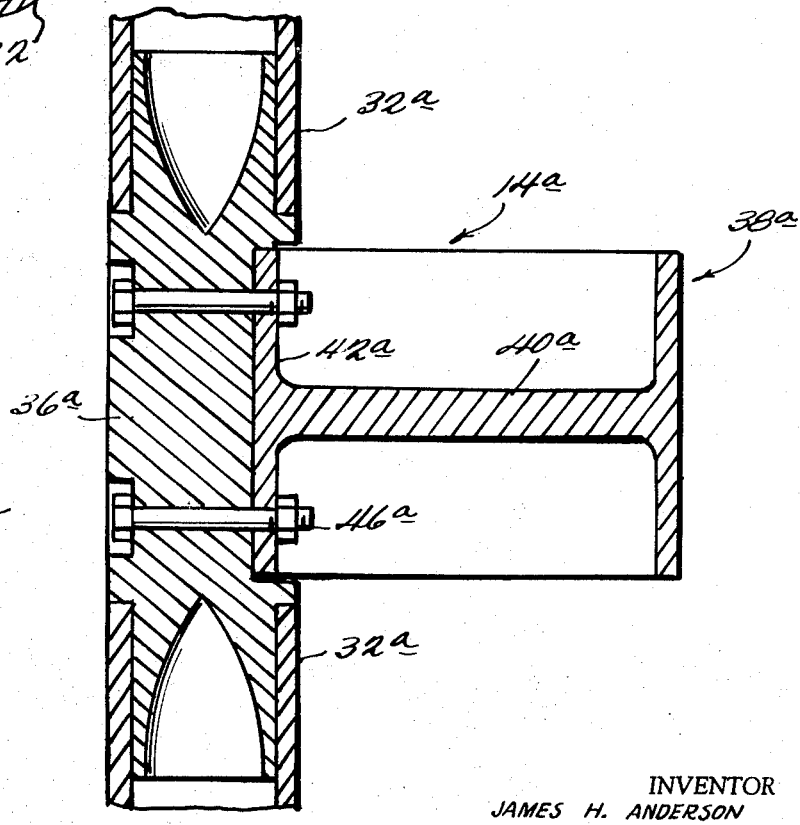
FIG. 5 is a view similar to FIG. 3 illustrating a modified construction.

FIG. 5 illustrates a slightly different form of joint 14a between the ends of the tubes 32a of two adjacent pipe sections. In this construction the center portions of the plugs 36a are recessed to receive the inner flange 42a of the stiffening ring 38a. One flange 42a is secured directly to each plug 36a by two bolts 46a which are disposed on opposite sides of the web 40a.

FIGS. 6 and 7 illustrate a somewhat different form of joint 14b between the ends of two tubes 32b. In this construction the opposed ends of two tubes 32b are sealed with closure plugs 41 and 43 which are connected to each other by means of a snap ring 47. The lower end 48 of the plug 41 is dish shaped and engages the bottom wall 50 of a recess in the other plug 43. By forcing the plugs together enough to deflect the engaging ends, the snap ring 47, which is carried in a groove in the periphery of the plug 41, snaps into a complementary recess in the other plug 43. The dished end 48 acts as a spring to hold the joint tight. As seen in FIG. 7, the plug 43 is provided with a pair of bosses 54 which in a completed assembly project toward the inner flange 42b of a stiffening ring 38b. Resilient pads 48b are disposed between the bosses 54 and the flange 42, and the latter two structures are connected with bolts 46b.

An alternative connection between the plugs 41 and 43 can be affected by omitting the snap ring 47 and providing threads in the same general location as the ring 47.

FIGS. 8 and 9 illustrate a joint 14c which is similar to that shown in FIGS. 6 and 7. In this construction the ends of two tubes 32c are closed with plugs 56 and 58 which are screwed together at 60, and a separate bolting ring 62 is provided for connecting the assembly to the stiffening ring 38c. The bolting ring 62 fits in a complementary recess defined between the ends of the plugs 56 and 58 and carries bosses 54c which project toward the stiffening ring 38c. In this case the bolting ring 62 is free to rotate on the tubes to orient it properly with the stiffening ring 38c. After proper orientation has been established the joint 60 is tightened. As in the construction illustrated in FIGS. 6 and 7, the inner flange 42c of the stiffening ring 38c is bolted to the bosses 54 by means of bolts 46c with resilient pads 48c interposed between the surfaces to permit some relative movement.

FIG. 9 also illustrates a modified form of the gasketlike elements 34c which are shown as being of unitary construction and enlarged cross section so as to provide a rubber covering for the inside of the pipe. This construction protects the inside of the pipe from abrasion where solid material is carried along with the water passing through the pipe.

While the elements 32 have been described as tubes in order to distinguish them from the main pipe 10, it will be understood that in a large construction they will themselves be relatively large pipes. For example, the main pipe 10 when employed to transmit a large flow of deep cold water may be about 24 feet in diameter and be constructed of about 120 conventional 8-inch pipes joined together as described above. An 8-inch, schedule 30 seamless steel pipe is buoyant when gas-filled and sealed and, accordingly, the overall pipe structure will be buoyant or very nearly buoyant depending on the weight of the joints 14 which are employed. It is not strictly necessary that the tubes 32 be buoyant so long as their displacement in water is sufficient to create a substantial upward force on the overall pipe 10.

The advantages of the tubular wall construction, aside from the above-discussed buoyant effect, include flexibility, strength and economy of construction. Flexibility and strength are imparted by the tubular construction, because the individual tubes 32 can bend relatively more easily than an integral pipe wall of greater diameter, and because the walls of the tubes 32 can withstand the high external pressures of great depths without collapsing. Since the tubes 32 may be conventional pipes, no special equipment is required for their manufacture. Other advantages include the compartmentalization effected by the plugs 36 so that a leak of sea water into one tube 32 does not appreciably effect the overall buoyancy of the pipe 10. When the pipe 10 is employed for conducting cold deep water, the hollow tubes 32 provide an insulating effect which reduces heat transfer from the warm surface water into the cold water in the pipe 10. The bolted construction at the joints 14 is advantageous in facilitating the assembly and disassembly of the pipe sections 12 at the site at which the pipe 10 is to be employed.

I claim:

1. An elongated pipe having a wall defining a fluid passage, said wall being formed of a plurality of longitudinal pipe sections disposed end-to-end, each of said sections comprising a plurality of discrete, parallel, sealed tubes arranged with their axes parallel to the axis of the pipe and each of said tubes being of substantially smaller diameter than the diameter of the pipe and being defined by a discrete continuous wall which is separate from the walls defining the other tubes, said tubes being hollow and sealed against entry of liquid, means sealing the exterior of each tube to the exterior of adjacent tubes along the length thereof so as to render said wall substantially leakproof and joining means connecting together adjacent pipe sections and sealing the ends of the tubes.

2. A pipe as in claim 1 wherein each of said tubes is of circular cross section.

3. A pipe as in claim 1 wherein said joining means includes a continuous rigid ring member encircling said pipe and means securing said ring to each of said pipe sections.

4. A large diameter submerged pipe extending generally vertically in a body of water, said pipe being constructed of a plurality of hollow sections arranged end-to-end, each of said sections having a hollow cylindrical wall defining a substantially unobstructed passage, said wall being formed of a plurality of discrete, parallel, sealed tubes arranged with their axes parallel to the axis of said pipe, each of said tubes being cylindrical and having a substantially smaller diameter than the diameter of said pipe, a plurality of connecting and stiffening means encircling said pipe at axially spaced locations and joining the ends of adjacent pipe sections at said locations, said pipe experiencing an upward force along its length due to the buoyant force acting on each of said tubes, the magnitude of said buoyant force being dependent on the wall thickness and inner diameter of said tubes, and sealing means extending the length of said pipe and preventing any appreciable radial leakage of fluid between said unobstructed passage and the exterior of said pipe.

5. A pipe as in claim 4 wherein said connecting means between sections cooperate with the ends of all the tubes of each section to effectively seal said tube ends.

6. A pipe as in claim 1 wherein said joining means includes a ringlike member encircling said pipe at the location of the ends of adjacent pipe section, plug means sealing the ends of the tubes in both adjacent pipe sections and fastening means connecting the plug means to said ringlike member.

7. A pipe as in claim 1 wherein said means sealing the exteriors of the tubes comprises elongated resilient gasket elements disposed between and engaging the walls of adjacent tubes.

8. A pipe as in claim 5 wherein said connecting means includes a ringlike member encircling said pipe, plug means sealing the ends of the tubes in both adjacent pipe sections and fastening means connecting the plug means to said ringlike member.